May 7, 1957 J. A. MORTON 2,791,761

ELECTRICAL SWITCHING AND STORAGE

Filed Feb. 18, 1955

INVENTOR
J. A. MORTON
BY D. H. Wilson, Jr.
ATTORNEY

United States Patent Office 2,791,761

Patented May 7, 1957

2,791,761

ELECTRICAL SWITCHING AND STORAGE

Jack A. Morton, South Branch, N. J., assignor to Bell Telephone Laboratories, Incorporated, New York, N. Y., a corporation of New York Application February 18, 1955, Serial No. 489,241

15 Claims. (Cl. 340—173)

This invention relates to semiconductive signal translators and methods of and circuits for their utilization and more particularly to devices, methods, and switching circuits which can be used to store information.

One object of this invention is to improve semiconductive devices employed for signal translation.

Other objects are to simplify methods of storing information, to simplify the apparatus necessary to store information, to increase the interval over which information can be stored, to store information which can be read out without destruction, to initiate a low resistance condition in a circuit by the application of a momentary electric impulse, and to maintain a circuit in one of two conductive conditions without expending other than the actuating energy.

In accordance with these objects, one feature of this invention resides in altering the state of a conductive path through a semiconductor by establishing an electrostatic charge adjacent a surface of the semiconductor.

Another feature involves employing a ferroelectric body maintained in close proximity to a semiconductive surface as a means of altering the conductivity through the semiconductive body. An electrostatic charge can be established in the ferroelectric body portion adjacent the semiconductor by applying an electrostatic field across it. The portion of the charge sustained in the ferroelectric after the removal of the field sustains the altered state of conduction in the semiconductor and thus functions as a memory of the signal last applied across the ferroelectric.

Another feature resides in controlling the conductive characteristics of a semiconductive device containing a rectifying barrier by positioning a ferroelectric against a surface portion in the vicinity of the barrier and altering the electrostatic charge on that surface portion by the application of signals across the ferroelectric. One form of rectifying barrier particularly amenable to control is the n-p junction and combinations of n-p junctions. The modification of the conduction characteristics of n-p junctions which intersect a semiconductive surface are described in detail below. Related semiconductive translators having the capacity to store information are disclosed in the applications of W. L. Brown, Serial No. 489,149; D. H. Looney, Serial No. 489,141; and I. M. Ross, Serial No. 489,223, all filed herewith.

The above and other objects and features of this invention will be more fully appreciated from the following detailed description when read with reference to the accompanying drawing, in which.

Figure 1:
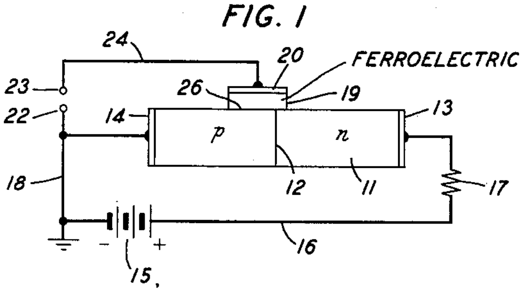
Fig. 1 shows an elevation of one form of device according to this invention and a circuit in which the device can be utilized.

It is to be noted that the proportions employed in the drawings are not representative of the actual devices. Generally, it is desirable that these devices have a substantial depth normal to the plane of the paper in order to offer a large interfacial area between the ferroelectric and the semiconductor.

Figure 3:
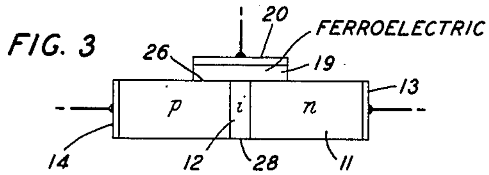
Fig. 3 is an elevation view of another form of this invention comprising a semiconductive body differing from that of Fig. 1 in combination with a ferroelectric control element.

Figs. 1 and 3 of the drawing show semiconductive elements which control the current flowing between their terminals in response to a signal applied across a ferroelectric body. These devices each comprise a semiconductive body 11 containing a rectifying barrier region 12. Low resistance, substantially nonrectifying connections 13 and 14 are made to the body on opposite sides of the barrier to establish a conductive path through semiconductive material and across the barrier region. Specifically, the structure of Fig. 1 includes a semiconductive body containing contiguous zones of n and p conductivity type material and an intermediate n-p junction forming a rectifying barrier. The structure of Fig. 3 includes, in addition to the zones of n and p conductivity type, a zone 28 of intrinsic semiconductive material of finite width intermediate those zones and forming a major portion of the rectifying barrier region.

Each of the semiconductive elements of Figs. 1 and 3 can be connected in a utilization circuit as shown in Fig. 1. In this circuit the n-type material is connected to the positive terminal of a potential source, battery 15, through lead 16, load 17, and connection 13. Connection 14 to the p-type material is grounded as is the negative terminal of battery 15 through lead 18. The general form of the electrical characteristics of these semiconductive elements are represented by the solid line in Fig. 5. When poled in the reverse or high resistance direction, as shown, operation of the semiconductor is ordinarily in the first quadrant of Fig. 5.

Figures 5, 6, 7:
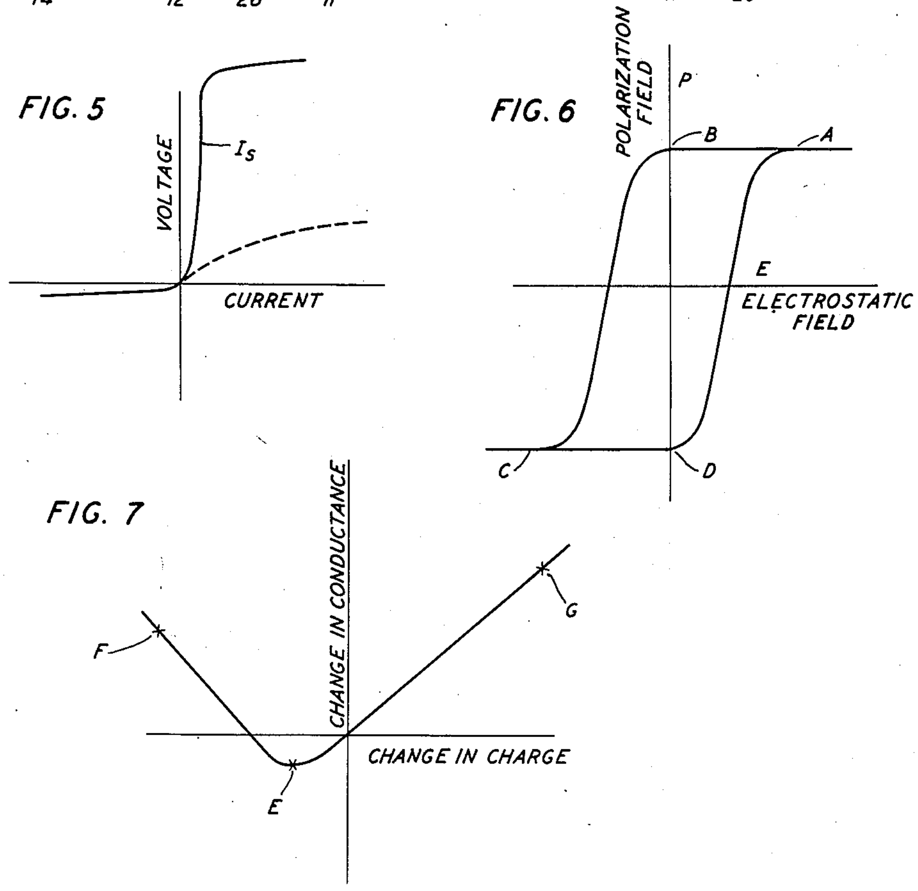
Fig. 5 is a plot of the voltage-current characteristic across the connections to the semiconductive body of Fig. 1.
Fig. 6 is a plot of the polarization field in the ferroelectric element of Fig. 1 against the applied electrostatic field showing the state of the charge both as to magnitude and polarity on the ferroelectric surfaces.
Fig. 7 is a plot of the change in conductivity in the semiconductor due to the change in charge on its surface.

A control element in the form of a body 19 of ferroelectric material and an electrode 20 is mounted against the surface of the semi-conductor in the rectifying barrier region. Signals applied between the electrode 20 and ground by means of terminals 22 and 23, respectively, connected to lead 18 and lead 24 to electrode 20, apply an electrostatic field across the ferroelectric. In this arrangement the ferroelectric body 19 functions as a dielectric between the condenser plates constituted by electrode 20 and the surface 26 of the semiconductive body. By virtue of the polarization hysteresis of the ferroelectric, as illustrated in Fig. 6, the charge induced therein by the signal remains for a substantial interval following the removal of or reduction of the signal or until a signal generating an opposing field sufficient to reverse that remnant charge is applied to terminals 22 and 23.

In operating devices of the type shown in Figs. 1 and 3, they can be placed in the low impedance condition by establishing a charge adjacent the semiconductive surface 26 of a sign corresponding to the sign of the majority charge carriers within the material bounding the rectifying barrier region having the lower resistivity. In practice, the charge has been effective in altering the conductivity between terminals 13 and 14 when adjacent the lower resistivity material within about a minority carrier diffusion length of the junction. Devices having two ohm-centimeter material of n conductivity type and 0.1 ohm-centimeter material of p conductivity type can be placed in their low impedance condition by applying a positive charge adjacent the p-type surface within about an electron diffusion length of the space charge region around the rectifying junction. Similarly, devices of 0.2 ohm-centimeter n-type and two ohm-centimeter p-type material are switched to a low impedance state by applying a negative charge adjacent the n-type material near and advantageously in contact with the space charge region around the rectifying junction. Both forms of devices show particularly large changes in characteristics when the charges are imposed over a surface 26 extending across the junction region.

Figure 4:
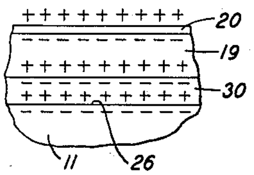
Fig. 4 is a schematic representation of a broken away portion of the semiconductor and charging elements of Figs. 1 and 2, greatly enlarged and distorted in proportions for purposes of illustration.

When the controlling surface charge is imposed by means of a ferroelectric body mounted in proximity to semiconductive surface 26 near the rectifying barrier region, charges of both signs are applied in traversing the electrostatic hysteresis loop of the ferroelectric. As is shown in Fig. 4, the application of a positive charge to electrode 20 of the devices of Figs. 1 and 3 produces a positive charge on the surface of ferroelectric body 19 adjacent semiconductor surface 26. It also establishes a field in any gap which may exist between the ferroelectric and the electrodes 20 and 26, as represented by the gap filled with dielectric 30 to be discussed in more detail below. A reversal of the electrostatic field produced by applying a negative charge on electrode 20 reverses the sign of the charge distribution shown provided it is sufficient to overcome the remnant polarization of the ferroelectric. Either charge distribution is maintained by the remnant polarization in the ferroelectric, even when currents of either a constant or modulated level are passed through the semiconductive body 11 and across the rectifying barrier region 12.

Reversal of the sign of polarization adjacent the surface 26 from that characterized as the "on" polarization, the low impedance condition for the semiconductor, has produced an increase in the reverse impedance of the path between terminals 13 and 14 which exceeds that obtained when the electrostatic charge in the ferroelectric has been removed. Hence, the device offers a means of memorizing the polarity of the signal last applied across the ferroelectric as a high or low impedance state which is sustained over substantial intervals.

One mechanism which may explain the operation of these devices relies upon the creation therein by the charge of a surface layer of altered conductivity characteristics.

When low levels of positive charge are imposed adjacent the semiconductive surface, small quantities of electrons are concentrated in the semiconductor near its surface. These electrons tend to reduce the number of mobile positive charge carriers or holes normally present in p-type material, thereby increasing the resistivity of the material as shown by the reduction in conductance proceeding from the origin of the curve in Fig. 7 toward E. An increase in the surface charge beyond this level attracts electrons in concentrations which predominate over the holes, thereby temporarily converting the material to n conductivity type having a conductivity which is a function of the charge level, for example as shown at F in Fig. 7. Similarly, the n-type material or the intrinsic material, has its surface region adjacent a positive electrostatic charge altered by a compensating concentration of electrons. These electrons tend to convert the intrinsic material to an extrinsic semiconductor of n conductivity type and to increase the conductivity of normally n-type material. This increase follows the form shown in Fig. 7 and for positive surface charges on n-type material can be represented as an increase in conductivity from the origin toward the right, for example to G. Charges imposed adjacent the semiconductive surface in this manner are effective to a depth of about $10^{-5}$ centimeters below that surface.

Figure 2:
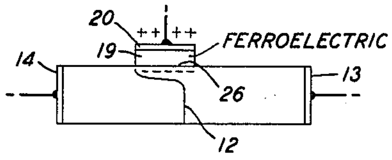
Fig. 2 shows the charge orientation and n-p junction modification for the low resistance condition of the device of Fig. 1.

The conversion of the p-type material subjected to the positive electrostatic charge on ferroelectric 19 to n-type in its surface region, temporarily shifts the effective position and alters the area of the n-p junction 12 of the device of Fig. 1 as shown in Fig. 2. Similarly, a charge of this nature imposed on the device of Fig. 3 creates an n-type region across the surface of intrinsic zone 28 and an inversion of the surface of the p-type zone to n-type. This layer, at the surface containing a high concentration of electrons, has been termed an "n-type channel." While an n-type channel extends from the n-type zone to the p-type region the reverse current passed by the rectifying barrier region increases due to the increased area of that region, the reverse characteristic of the semiconductor enters a high conductivity state as shown by the dashed line in Fig. 5, and a large signal current either constant or modulated, will pass through the device to the load 17. The ferroelectric will sustain the surface charge and thus the conductivity state of the semiconductor while current is passed.

Surface states, which may form a thin layer of charges, may influence the effect of the applied charge.

A second mechanism suggested as a means of explaining the observed operation of these devices is that of field breakdown of the semiconductor. This phenomena is characterized by the generation of electrons and holes in a semiconductor when that semiconductor is subjected to electrostatic fields, as might be imposed by the surface charge, in excess of a threshold level. The threshold level of breakdown is an inverse function of the conductivity of an electronic semiconductor; hence, this mechanism is consistent with the observed tendency of the lower resistivity material to enter the "on" state at the levels of charge employed, while at these levels the material of greater resistivity is not affected.

Minority charge carriers generated by this field breakdown are believed to drift across the rectifying barrier and thus reduce the reverse impedance of that region. The field created by a charge of the sign opposite that of the "on" charge is ineffective, since the opposing charge of surface states on the semiconductor maintain it below the threshold value of field generation according to this theory of operation.

The semiconductive devices discussed can be switched to their "off" or high resistance reverse characteristic where they pass only the normal barrier saturation current $I_s$ by removing the "on" surface charge. This is accomplished by applying a signal to terminal 23 which develops an electrostatic field across the ferroelectric sufficient to reverse the direction of polarization to point C of Fig. 6 and induce a surface charge of opposite sign. A remnant polarization of a magnitude represented at D will be sustained in the ferroelectric until a field of opposite sign is applied thereto.

In order to most effectively utilize the electrostatic field imposed across the ferroelectric body it is desirable to mount it as close to the semiconductor surface as possible. This can be done by producing smooth mating surfaces upon each element. Such surfaces can be attained by conventional techniques of grinding and mechanical and chemical polishing, or specifically in the case of some ferroelectrics by cleaving the crystal from which the element is derived.

In practice, it has been found that satisfactory results can be obtained without exact matching of the ferroelectric surface to the semiconductive surface even if the gap between those surfaces contains air; however, greatly improved results are realized by interposing therebetween some suitable high dielectric medium. As shown in Fig. 4, there may be some space between the ferroelectric body 19 and the semiconductor which, in the case of a low dielectric medium such as air, would require the application of a substantial field. The required field can be reduced by employing a high dielectric 30, such as a wax or liquid. Other criteria for the dielectric in the interfacial region include a high breakdown characteristic, preferably sufficient to withstand the entire field, a high chemical stability, and a low conductivity so that surface charge will not leak therethrough.

While the mode of operation described above is applicable at least in theory to all known ferroelectric materials, devices of this nature can most readily be constructed with isomorphic crystals containing the guanidinium ion. It has been found that guanidinium aluminum sulfate hexahydrate, $CN_3H_6Al(SO_4)_2 6H_2O$, has particularly advantageous ferroelectric characteristics for use in the combinations contemplated by this invention. A detailed discussion of these characteristics of techniques for its utilization and of fabricating techniques employed in preparing it for use as a ferroelectric is contained in the application of B. T. Matthias entitled "Ferroelectric Storage Device," Serial No. 489,193, filed herewith.

Guanidinium aluminum sulfate hexahydrate has a small signal dielectric constant about one-tenth that of barium titanate, about fifteen in the ferroelectric direction while barium titanate is about 150. Further, it has a low saturation polarization as compared to barium titanate and therefore does not produce such high electrostatic fields as barium titanate. Accordingly, the problem of dielectric breakdown in the gap is reduced by a factor of about 75 when guanidinium aluminum sulfate hexahydrate is employed in place of barium titanate, a greater flexibility is afforded in the choice of gap dielectrics even to the extent of enabling narrow gaps filled with air to be employed, and the devices can be polarized with the application of lower signal voltages. With materials of this nature, nitrobenzene as a liquid or ethylene cyanide as a solid having adhesive qualities, can be employed as suitable dielectric substances 30 to fill any gaps between the semiconductor and ferroelectric since their dielectric constants at room temperature are about 35 and 65, respectively. They can be readily applied to the semiconductor or ferroelectric surface prior to assembly.

As a specific example of this invention employed as a storage device, a single crystal germanium body 11 having a grown n-p junction formed by pulling a seed from a melt of adjusted composition is provided with low resistance bonded contacts 14 and 13. The contact to the p-type material is of pure gold, and that to the n-type material is gold containing a significant proportion of antimony. In typical units, the p-type zone of the body had a bulk resistivity of 0.1 ohm-centimeter while that of the n-type zone was 3.1 ohm-centimeters. A crystal 19 of guanidinium aluminum sulfate hexahydrate sheared normal to the *c* axis and prepared as outlined in the aforenoted B. T. Matthias application, was mounted so that it extended over the n-p junction and covered the areas penetrated by the space charge of the reverse biased junction. The crystal was about 10 mils thick and was provided with a silver paste electrode 20 applied in paste form and air dried. It was mounted on a layer 30 of ethylene cyanide and was spaced from the germanium surface on the average by about 0.1 mil. In operation with potentials of from one to twenty volts applied in the reverse direction across the n-p junction 12, the n-type material positive, and switching signals of less than 200 volts applied to electrode 20, the impedance of the device between terminals 13 and 14 could be reduced from greater than 8000 ohms to less than 2000 ohms by charging the adjacent ferroelectric surface positive and could be increased from the lower value greater than 8000 ohms when the adjacent ferroelectric surface was charged negative. In studying devices of this nature employing air as a dielectric, a one volt reverse bias on the n-p junction, and a 500 volt switching signal applied across the ferroelectric, it was found that they could be switched from an impedance of 20,000 ohms when electrode 26 was poled negative to 4000 ohms when it was poled positive. The p-type material, that of lower resistivity, was most significant in the switching process. Switching could be achieved with storage of the signal while the ferroelectric was advanced from the p-type surface toward the junction in all positions of the ferroelectric between that at which its leading edge was within about 25 mils of the junction and that at which its trailing edge crossed the junction.

Devices having single crystal germanium bodies containing a grown junction between an n conductivity type zone of 0.2 ohm-centimeter resistivity and a p-type zone of two ohm-centimeter resistivity exhibited greater reverse with a surface over the n-type material poled positive than with that surface poled negative. The guanidinium aluminum sulfate hexahydrate crystal was about 10 mils thick, was separated from surface 26 by an air gap having an average thickness of about 0.1 mil, and was polarized by the application of a switching signal of about 700 volts. Sensitivity was dependent upon crystal position. Switching action of this type was observed with the major portion of the crystal positioned above the n-type material. When the crystal is principally above the p-type material the "on" condition is achieved by poling the adjacent ferroelectric surface positive.

The field across the guanidinium aluminum sulfate hexahydrate is suitable for operation upon an electrostatic hysteresis loop as shown in Fig. 6 when fields above about 950 volts per centimeter are applied. Where short rise times are sought, it is desirable to operate in the range of fields from 4000 to 20,000 volts per centimeter. When so operated, switching times of the order of 10 to 100 microseconds can be realized from devices of the type under discussion.

Higher impedances can be obtained by employing low conductivity dielectrics in the semiconductor-ferroelectric gap. Air enables one to approach the reverse impedances of conventional n-p junction. Alternatively, a structure as shown in Fig. 3 will enhance the ratio of reverse impedances for negative and positive surface charges on the adjacent ferroelectric since the intrinsic zone 28 between the n- and p-type materials increases the length of the leakage path across the rectifying barrier without appreciably reducing the conductance for the low resistance condition.

While the above description has been directed principally to germanium devices, it is to be understood that other electronic semiconductors can be utilized in the practice of this invention. For example, silicon-germanium alloys, intermetallic compounds of group III and group V elements, tellurium, selenium, and semiconductive compounds can all be used. Further, other dielectric and ferroelectric media will function satisfactorily in the combination. These ferroelectrics include those exemplified by Rochelle salt, ammonium dihydrogen phosphate, ammonium lithium tartrate, barium titanate, and those isomorphic crystals containing the guanidinium ion set forth in the above-noted B. T. Matthias application. The form of the rectifying barrier region which may be influenced by a stored electrostatic charge in accordance with this invention also encompasses those of the type developed at a metal-semiconductor interface, for example by positioning the ferroelectric closely adjacent the rectifying contact of a point contact rectifier.

It is to be understood that the above-described arrangements are illustrative of the application of the principles of the invention. Numerous other arrangements may be devised by those skilled in the art without departing from the spirit and scope of the invention.

What is claimed is:

1. Apparatus which comprises a body of germanium including an n-p junction, a pair of connections to said body positioned on opposite sides of said n-p junctions, a body of guanidinium aluminum sulfate hexahydrate positioned against the surface of said germanium body in the vicinity of said n-p junction, and an electrode positioned against said guanidinium aluminum sulfate hexahydrate body and spaced from said semiconductive body.

2. Apparatus which comprises a body of semiconductive material including an n-p junction, a pair of connections to said body positioned on opposite sides of said n-p junction, a body of ferroelectric material positioned against the surface of said semiconductive material in the vicinity of said n-p junction, and an electrode positioned against said ferroelectric material and spaced from said semiconductive body.

3. Apparatus which comprises a body of semiconductive material including an n-p junction, a surface of said body intercepting said n-p junction, a pair of connections to said body on opposite sides of said n-p junction, a body of ferroelectric material positioned against said semiconductive surface in the vicinity of said n-p junction, and an electrode mounted against said ferroelectric body and spaced from said semiconductive body.

4. Apparatus which comprises a body of semiconductive material including an n-p junction, a surface of said body intercepting said n-p junction, a pair of connections to said body on opposite sides of said n-p junction, a body of ferroelectric material mounted against said semiconductive surface and extending across said n-p junction, and an electrode mounted against said ferroelectric body and spaced from said semiconductive body.

5. Apparatus which comprises a semiconductive body including in succession a zone of n conductivity type material, a zone of intrinsic material, and a zone of p conductivity type material, a low resistance, substantially nonrectifying connection to each of said n- and p-type zones, a body of ferroelectric material positioned against the surface of said semiconductive material in the vicinity of said intrinsic zone, and an electrode positioned against said ferroelectric material and spaced from said semiconductive body.

6. Apparatus which comprises a body of semiconductive material including a p conductivity type zone of low resistivity and an n conductivity type zone of higher resistivity forming a rectifying barrier therebetween, a low resistance, substantially nonrectifying connection to each of said zones, a body of ferroelectric material positioned against the surface of the p-type semiconductive material in the vicinity of said rectifying barrier region, and an electrode positioned against said ferroelectric material and spaced from said semiconductive body.

7. Apparatus which comprises a body of semiconducitve material including an n conductivity type zone of low resistivity and a p conductivity type zone of higher resistivity forming a rectifying barrier therebetween, a low resistance, substantially nonrectifying connection to each of said zones, a body of ferroelectric material positioned against the surface of the p-type semiconductive material in the vicinity of said rectifying barrier region, and an electrode positioned against said ferroelectric material and spaced from said semiconductive body.

8. A switching circuit comprising a semiconductive body including an n-p rectifying barrier, a pair of electrical connections to said body on opposite sides of said barrier, a potential source connected to said connections and biasing said rectifying barrier in its reverse direction of conduction, a body of ferroelectric material in close proximity to the semiconductive material in the vicinity of said rectifying barrier, and means for applying a signal across said ferroelectric body to establish a remnant polarization therein whereby the reverse conductivity characteristic of said rectifying barrier is altered.

9. A switching circuit comprising a semiconductive body, a pair of electrical connections to said body, said body including an n-p junction between said connections, a potential source connected to said connections and biasing said n-p junction in its reverse direction of conduction, a body of ferroelectric material in close proximity to the semiconductive material in the vicinity of said n-p junction, and means for applying a signal across said ferroelectric body to establish a remnant polarization therein whereby the reverse conductivity characteristic of said n-p junction is altered.

10. A switching circuit comprising a body of semiconductive material, a pair of connections to said body, the body including an n-p junction between said connections and a surface of said body intersecting said n-p junction, means connected to said connections for applying a reverse potential across said n-p junction, load means connected to said connections responsive to changes in the conduction characteristics of said semiconductive body, a ferroelectric body positioned against said semiconductive surface in the vicinity of said n-p junction, and means for applying a signal across said ferroelectric to establish a remnant polarization therein whereby the conducting characteristic of said n-p junction in its reverse direction is altered.

11. A switching circuit comprising a semiconductive body including a region of p conductivity type and a region of n conductivity type material of higher resistivity than the major portion of said p-type material within said body forming a rectifying barrier region between said n- and p-type regions, electrical connections to said body on each of said n- and p-type regions, a potential source connected to said connections and biasing said rectifying barrier region in its reverse direction of conduction, a body of ferroelectric material in close proximity to said p-type region in the vicinity of said rectifying barrier region, and means for applying a signal across said ferroelectric body to establish a positive charge therein adjacent the semiconductive material whereby the conductivity between said connections is increased.

12. A switching circuit comprising a semiconductive body including a region of n conductivity type and a region of p conductivity type material of higher resistivity than the major portion of said n-type material within said body forming a rectifying barrier region between said p- and n-type regions, electrical connections to said body on each of said p- and n-type regions, a potential source connected to said connections and biasing said rectifying barrier region in its reverse direction of conduction, a body of ferroelectric material in close proximity to said n-type region in the vicinity of said rectifying barrier region, and means for applying a signal across said ferroelectric body to establish a negative charge therein adjacent the semiconductive material whereby the conductivity between said connections is increased.

13. Apparatus which comprises a body of semiconductive material including two contiguous zones of opposite conductivity type defining a rectifying barrier, a separate electrical connection to each of said two zones, a body of ferroelectric material in close proximity to the semiconductive body in the vicinity of said rectifying barrier, an electrode spaced from said semiconductive body and mounted against said ferroelectric body, and a flowable material having a dielectric constant exceeding unity in the ferroelectric-semiconductive interstices.

14. Apparatus which comprises a body of semiconductive material including two contiguous zones of opposite conductivity type defining a rectifying barrier, a separate electrical connection to each of said two zones, a body of ferroelectric material in close proximity to the semiconductive body in the vicinity of said rectifying barrier, and an electrode spaced from said semiconductive body and mounted against said ferroelectric body.

15. A switching circuit comprising a semiconductive body including a pair of contiguous zones of opposite conductivity type defining a rectifying barrier therebetween, a separate electrical connection to each of said zones, a potential source connected between said electrical connections for biasing the rectifying barrier in its reverse direction of conduction, a body of ferroelectric material in the vicinity of said rectifying barrier and adjacent a surface of one of said zones, and means for controlling the polarization of the ferroelectric material for controlling conduction across said rectifying barrier.

No references cited.